United States Patent [15] 3,659,195
Cardozo et al. [45] Apr. 25, 1972

[54] METHOD OF TESTING MAGNETIC RECORDING CARRIERS FOR DEFECTS IN THE MAGNETIC LAYER

[72] Inventors: Benjamin Lopes Cardozo; Daniel Johannes Hindericus Admiraal; Gerrit Domburg, all of Emmasingel, Eindhoven, Netherlands

[73] Assignee: U.S. Philips Corporation, New York, N.Y.

[22] Filed: Aug. 29, 1969

[21] Appl. No.: 854,158

[30] Foreign Application Priority Data

Aug. 31, 1968 Netherlands..........................6812449

[52] U.S. Cl. ..........................................................324/34 TA
[51] Int. Cl. ..........................................................G01r 33/12
[58] Field of Search..............................................324/34 TA

[56] References Cited

UNITED STATES PATENTS 2,922,106 1/1960 Oates et al..........................324/34 TA
3,185,922 5/1965 Wherry..............................324/34 TA
3,522,525 8/1970 Cottin et al..........................324/34 TA
3,525,930 8/1970 Hodge..............................324/34 TA

FOREIGN PATENTS OR APPLICATIONS 1,066,472 4/1967 Great Britain......................324/34 TA

*Primary Examiner*—Rudolph V. Rolinec
*Assistant Examiner*—R. J. Corcoran
*Attorney*—Frank R. Trifari

[57] ABSTRACT

A method and apparatus for characterizing defect levels and assigning valuations to these levels to enable the rejection of tapes containing defects exceeding predetermined levels, the apparatus including a series of resistant dividers which are weighted in determining the depth of a defect and a series of monostable multivibrators for determining duration, each of these factors having progressive values assigned thereto, a matrix responsive to combinations of depth and duration for determining the annoyance value of a defect, and an output for accumulating the annoyance levels.

5 Claims, 5 Drawing Figures

METHOD OF TESTING MAGNETIC RECORDING CARRIERS FOR DEFECTS IN THE MAGNETIC LAYER

The invention relates to a method of testing magnetic recording carriers, hereinafter to be referred to as tapes, for defects in the magnetic coating. A test signal of substantially constant amplitude is recorded on the tape and subsequently is scanned so as to produce a signal which consists of the original signal on which pulses due to defects in the tape have been superimposed, said pulses being counted in a counter when their duration exceeds a predetermined value.

The known devices as described above have the disadvantage that in determining the annoyance caused by the fault no allowance is made for the degree in which these faults are perceived by human beings, with the result that tapes are rejected unnecessarily, as practice has shown.

This disadvantage is avoided by applying, according to the invention, the scanned signal to a device which records both the depth and the duration of the pulses, and assesses these properties as a function of psychological and physiological factors.

The term "depth of a defect" is used in this specification to mean the ratio, expressed as a percentage, between the minimum voltage electrically representative of the said defect and the voltage of the test signal. The duration of a defect is determined by the time interval between those points on the leading and trailing edges of the wave shape envelope of the voltage of the defect at which the amplitude has dropped 3 dB. Perception research has proved that a defect of a duration less than 10 ms, whatever its depth, does not cause annoying disturbances in music signals. In the present method, the defect duration is divided into, for example, three classes, i.e. class 1: from 10 to 20 ms, class 2: from 20 to 50 ms, and class 3: longer than 50 ms. The perception research has resulted in a scale of 12 annoyance values, i.e. values which determine the annoyance caused by a defect and which are given in the following annoyance or *h* table.

TABLE

| | | Greater than | | | | | | | | | | | | | | |
|---|---|---|---|---|---|---|---|---|---|---|---|---|---|---|---|---|
| Depth of defect, percent | | 66 | 63 | 57 | 53 | 49 | 44 | 40 | 36 | 32 | 27 | 23 | 19 | 15 | 10 | 5 |
| Duration of defect (in ms.) | 10–20 | ---- | ---- | ---- | ---- | 1 | 1 | 1 | 2 | 2 | 3 | 3 | 4 | 4 | 5 | 6 |
| | 20–50 | ---- | 1 | 1 | 2 | 3 | 4 | 5 | 5 | 6 | 7 | 8 | 9 | 10 | 11 | 12 |
| | >50 | 1 | 2 | 3 | 4 | 5 | 6 | 7 | 8 | 9 | 10 | 11 | 12 | 12 | 12 | 12 |

In one embodiment of the method according to the invention, in order to determine the annoyance value of the scanned signal, the duration of the pulses produced by scanning is converted in the apparatus into a signal which is applied to a first input of a matrix associated with the respective scan, the relative depth of the defect is measured in stages and the resulting signal is applied to a second input of the said matrix associated with the respective stage after which the signal appearing at an output of the matrix associated with two inputs is applied to a circuit arrangement which converts the signal into a number of pulses, which number is associated with this output, after which the pulses are applied to the counter.

An annoyance value *n* of 1 indicates that although a small decrease in sound volume is heard, it is not experienced as annoying. Only a *h* of 2 is regarded as annoying. Hence, in another embodiment of the method only those defects which exceed a given value are allowed to pass by a threshold device. If a defect having a given annoyance value is followed by a second defect having a higher annoyance value, the annoyance caused by the second defect is found to be equal not to its full annoyance value but only to the difference between this value and the annoyance value of the greatest preceding defect. Hence, in a further embodiment of the method according to the invention, only that part of the value of each succeeding defect is recorded which exceeds the value of the greatest preceding defect.

It has also been found that the occurrence of more than one defect causes an additional annoyance which is to be assessed by an additional value, such as an additional point, irrespective of its absolute value. For this purpose, in a further embodiment of the method of the invention each defect succeeding the first one and having a value exceeding a given threshold value is additionally assigned a constant number of additional counting pulses.

If, for example, within 1 second more than one defect occurs, this proves to be experienced as increasingly annoying. Therefore, in a further embodiment of the method according to the invention the signal is supplied to a circuit arrangement which in the case of several pulses occurring in quick succession advances the counter a number of steps, which number is equal to the number of these defects.

An apparatus for carrying out the method comprises a magnetic head for scanning the signal recorded on the tape and an amplifier for amplifying it. Also a first rectifier including appropriate circuitry is provided having a time constant greater than the duration of the longest defect for producing a reference voltage, a second rectifier including appropriate circuitry is provided having a time constant smaller than the duration of the shortest annoying defect, and an attenuator the input of which is connected to the second rectifier and tappings of which are connected to first inputs of a plurality of threshold detectors to first inputs of which the voltage of the first rectifier is applied. The output of the first threshold detector is connected through a first output of a first pulse shaper to a time circuit comprising a first monostable multivibrator having a reset time of about 10 ms which through a first output is coupled to an input of a second monostable multivibrator having a reset time of about 20 ms a first output of which is connected to a third monostable multivibrator having a reset time of about 50 ms, which multivibrators simultaneously change states. A second output of the first monostable multivibrator and the first output of the second monostable multivibrator are connected to inputs of a first and-gate, a second output of the second monostable multivibrator and the first output of the third monostable multivibrator are connected to a second and-gate. A second output of the first pulse shaper is connected to the reset inputs of the monostable multivibrators and also to the first inputs of third, fourth and fifth and-gates to second inputs of which the outputs of the first and second and-gates and the second output of the third monostable multivibrator are connected, the outputs of the third, fourth and fifth and-gates being connected to first inputs of a matrix the second inputs of which are connected to the other threshold detectors each through a defect-depth store. This store comprises a bistable multivibrator, as the case may be with the interposition of pulse shapers, the outputs of the matrix, which each are associated with a given annoyance value, being connected to a counter.

Features and advantages of the invention will appear from the following description of an embodiment thereof, given by way of example only, with reference to the accompanying drawings, in which.

Figure 1:
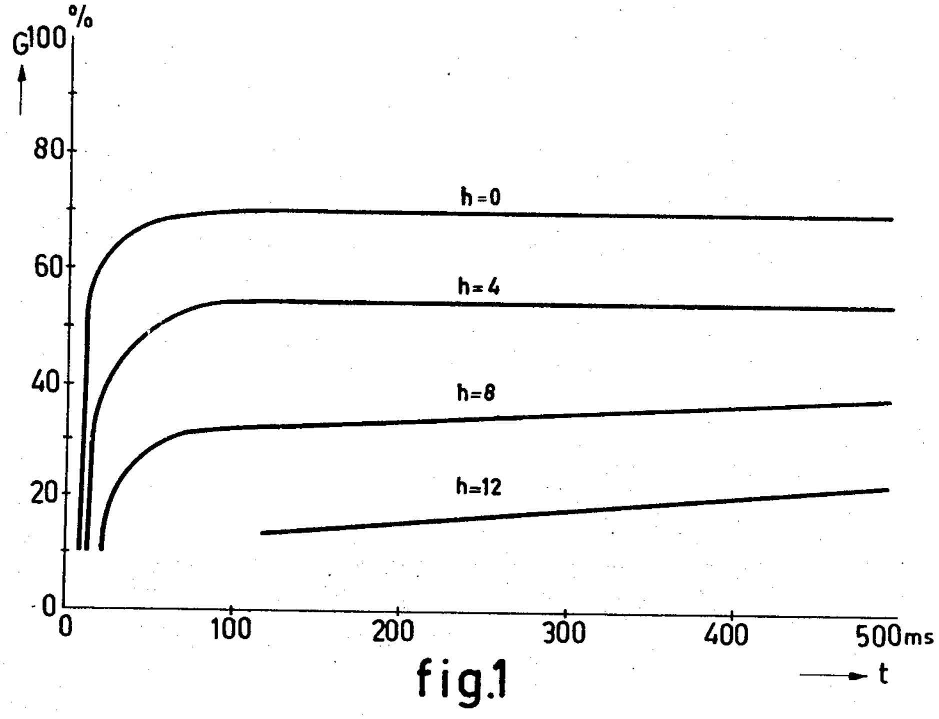
FIG. 1 shows the variation of the annoyance value h as a function of the defect duration and the defect depth.

Referring to FIG. 1, there are shown the curves of 4 annoyance values as a function of defect duration $t$ and defect depth G for the audio range. The graphs clearly show that a defect of less than 10 ms duration causes negligible annoyance whereas in the case of a time duration exceeding 10 ms the annoyance scarcely increases with time.

Figure 2:
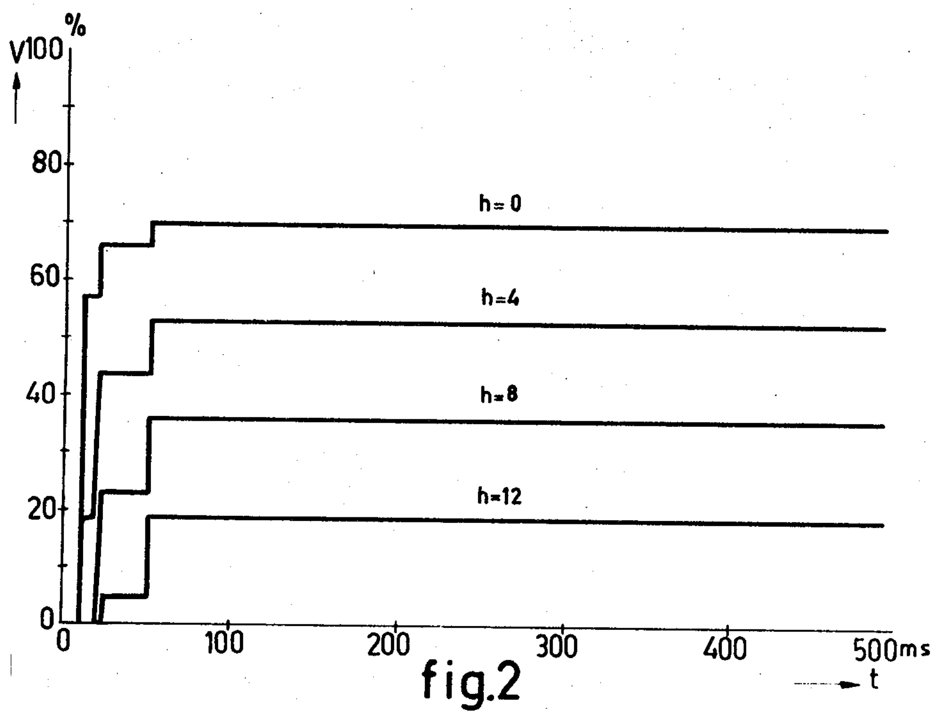
FIG. 2 shows the manner in which the curves of FIG. 1 may digitally be approximated.

FIG. 2 shows how the curves of FIG. 1 may reasonably be approximated digitally by the choice of three time intervals, namely from 10 to 20 ms, from 20 to 50 ms, and longer than 50 ms. Obviously, the curves may be approximated more closely by increasing the number of time intervals.

Figure 3:
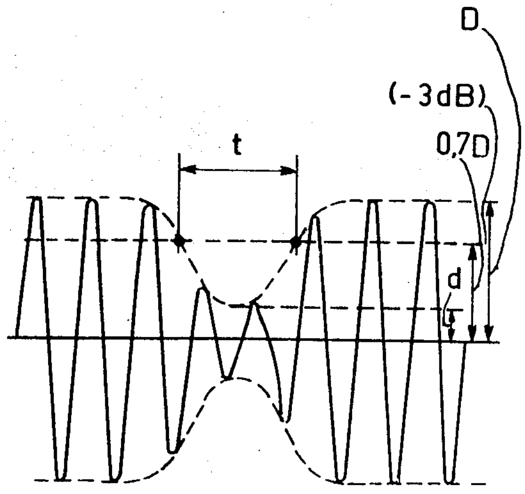
FIG. 3 shows the manner in which the time duration and the depth of a defect are defined.

FIG. 3 shows that the duration of a defect is determined by those points on the leading and trailing edges of the interference voltage at which the voltage of the continuous signal has decreased by 3 dB, i.e. at the value of about 70 percent of the peak value of the continuous signal. The depth of the defect is defined by the ratio between the smallest d and largest D amplitudes of the continuous signal expressed as a percentage.

Figure 4:
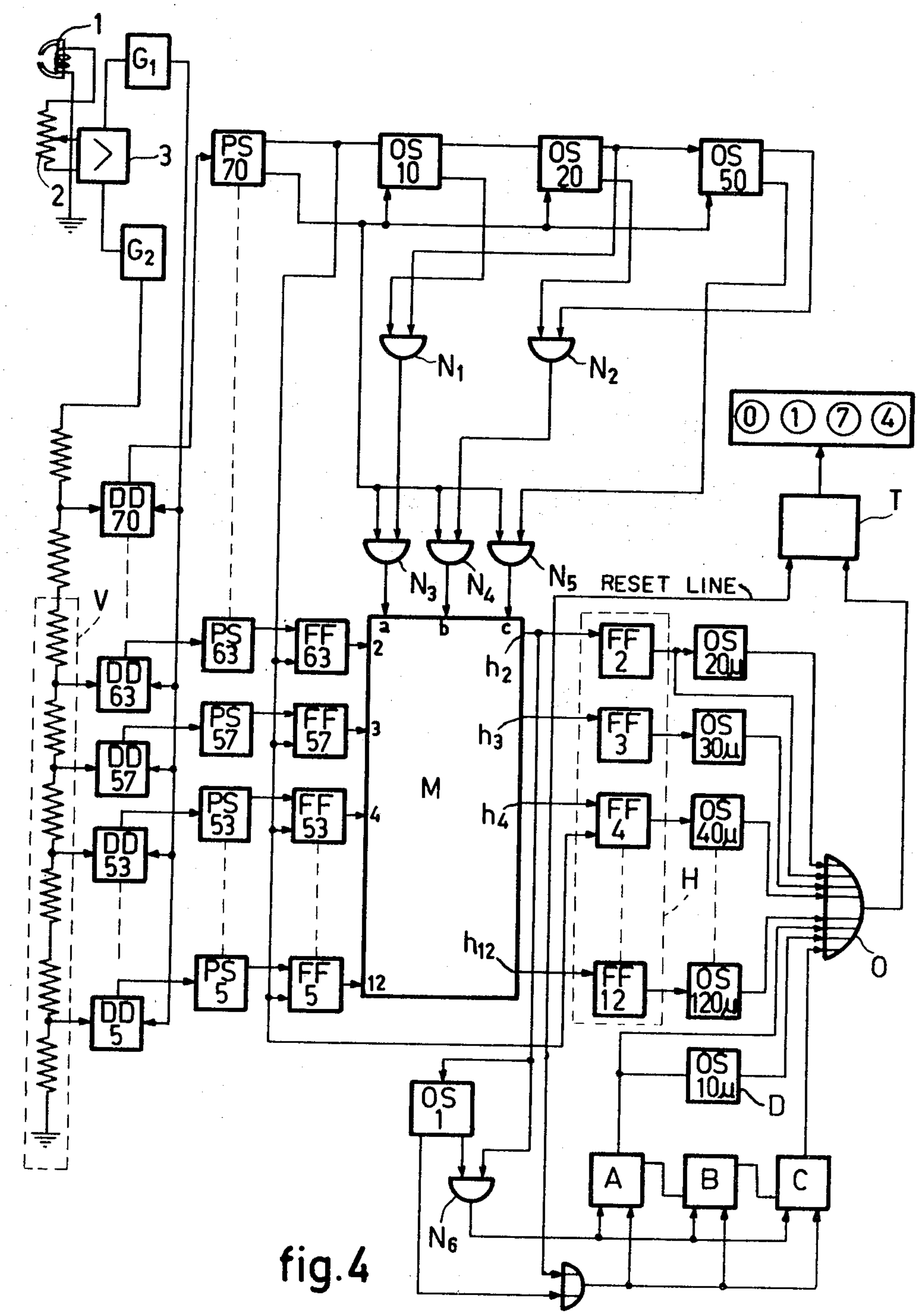
FIG. 4 is a block-schematic diagram of an apparatus for carrying out the method.

In FIG. 4, the voltage from a magnetic head 1 is applied through an input attenuator 2 to an amplifier 3, through one output of which the amplified signal is applied to a rectifier $G_1$ having a time constant larger than that of the longest defect, the output voltage of this rectifier serving as a reference voltage for the defect depth to be measured. The second output of the amplifier 3 is connected to a rectifier $G_2$ having a time constant of approximately 3 ms. The output of the second rectifier $G_2$ is connected to an attenuator V the tappings on which are connected to first inputs of a number of threshold detectors $DD_{70}$ to $DD_5$ which each are associated with a given level, the subscripts indicating the depth of a defect as a percentage. The output of the first rectifier $G_1$ is connected to second inputs of the threshold detectors $DD_{70}$ to $DD_5$. The outputs of those threshold detectors which each deliver a pulse when the defect reaches the depth indicated by the respective subscript are each connected to a respective pulse shaper $PS_{70}$ to $PS_5$. A first output of the pulse shaper $PS_{70}$ is connected to an input of a first monostable multivibrator $OS_{10}$ having a reset time of about 10 ms, a first output of the multivibrator being connected to an input of a second monostable multivibrator $OS_{20}$ which has a reset time of about 20 ms and a first input of which is connected to a third monostable multivibrator $OS_{50}$ having a reset time of about 50 ms, these three multivibrators being simultaneously caused to change states by a pulse from the pulse shaper $PS_{70}$. A second output of the first monostable multivibrator $OS_{10}$ and the first output of the second monostable multivibrator $OS_{20}$ are connected each to one input of an and-gate $N_1$, a second output of the second monostable multivibrator $OS_{20}$ and the first output of the third monostable multivibrator $OS_{50}$ are connected each to one input of a second and-gate $N_2$, a second output of the pulse shaper $PS_{70}$ being connected to the reset inputs of the monostable multivibrators $OS_{10}$, $OS_{20}$ and $OS_{50}$ and also to first inputs of third, fourth and fifth and-gates $N_3$, $N_4$ and $N_5$, the second inputs of which are connected to the outputs of the first and second and-gates $N_1$ and $N_2$ and to the second output of the third monostable multivibrator $OS_{50}$, respectively, whilst the outputs of the third, fourth and fifth and-gates $N_3$, $N_4$ and $N_5$ are connected to first inputs $a$, $b$ and $c$ of a matrix M, the second inputs 2 to 12 of which are connected to the threshold detectors $DD_{63}$ to $DD_5$ each through a pulse shaper $PS_{63}$ to $PS_5$ and to a fault-depth store comprising bistable multivibrators $FF_{63}$ to $FF_5$, respectively, second inputs of which multivibrators are connected to the first output of the pulse shaper $PS_{70}$ which at the beginning of a fault resets the fault-depth store.

Figure 5:
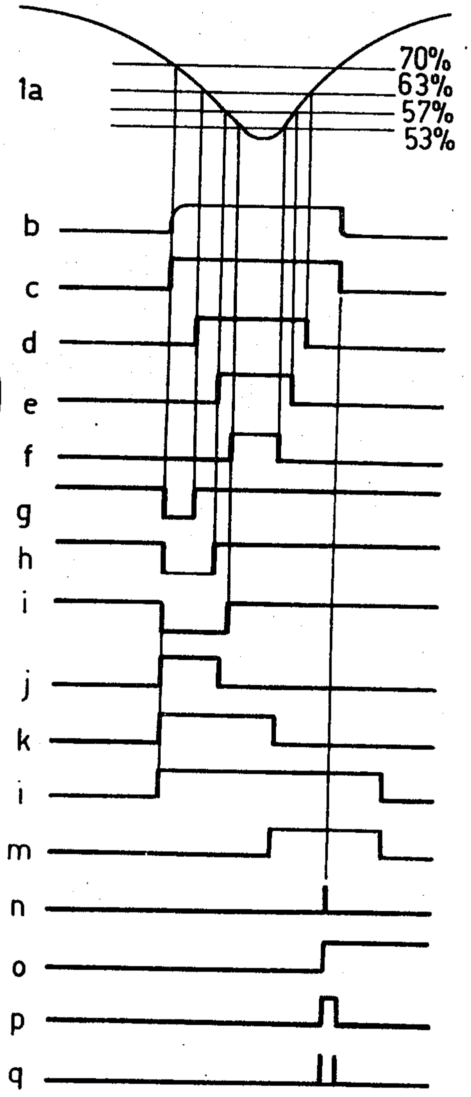
FIG. 5 shows as functions of time the voltages which appear at the outputs of the various circuit elements of FIG. 4 when a defect occurs.

In FIG. 5, 1$a$ indicates the variation of a direct voltage during a defect having a depth between 70 percent and 53 percent. When a depth of 70 percent is attained, the threshold detector $DD_{70}$ delivers a pulse the duration of which is equal to the duration of the defect and which is shown by $b$. This pulse is given steeper edges ($c$) in the pulse shaper $PS_{70}$ and then is applied to the defect-depth store comprising the bistable multivibrators $FF_{63}$ to $FF_5$, which are reset to their initial states and is also applied to the first monostable multivibrator $OS_{10}$, which changes state and in turn causes the second monostable multivibrator $OS_{20}$ to change state, which in turn causes the third monostable multivibrator $OS_{50}$ to change state. The voltages at the outputs of these multivibrators are indicated by $j$, $k$ and $l$, respectively. Shortly afterwards the threshold detectors $DD_{63}$ to $DD_{53}$ are rendered operative so as to deliver pulses to the pulse shapers $PS_{63}$ to $PS_{53}$, respectively, which in turn cause the bistable multivibrators $FF_{63}$ to $FF_{53}$, respectively, which serve as the defect-depth store and have been reset by the pulse shaper $PS_{70}$ on the 70 percent limit being reached, to change state. The output voltages of these bistable multivibrators are indicated by $g$, $h$ and $i$, respectively. When the end of the defect is reached, the threshold detector $DD_{70}$ and also the pulse shaper $PS_{70}$ change state again and because the and-gate $N_2$ associated with the time interval from 20 to 50 ms is open a pulse, indicated by $n$ in FIG. 5 can be transmitted to the input $b$ of the matrix M. With this combination there is associated an annoyance value of 2, so that at an output $h_2$ of the matrix a pulse of the shape indicated by $n$ in FIG. 5 appears, which causes a change of state of a bistable multivibrator $FF_2$ of an annoyance register H comprising bistable multivibrators $FF_2$ to $FF_{12}$, the subscripts indicating the associated annoyance values, so that the multivibrator $FF_2$ transmits a pulse to a counter T, through an or-gate O, and causes a change of state of a monostable multivibrator $OS_{20}$ $\mu$ which returns to the initial state after 20 $\mu$s and transmits a second pulse to the counter T through the or-gate O. These pulses are indicated in FIG. 5 by $o$ to $q$.

The internal connections of the matrix are designed such that only annoyance values greater than 1 will be transmitted to the annoyance register H.

Unlike the fault-depth store, which is reset for each defect, the annoyance register H is not reset. Consequently, during a measurement the register is progressively filled.

If the second defect in the tape should also have an annoyance value 2, the annoyance register H does not respond to it, because the bistable multivibrator $FF_2$ has already changed state.

If the third defect should have an annoyance value 4, the multivibrators $FF_3$ and $FF_4$ change states with the result that after 30 and 40 $\mu$s monostable multivibrators $OS_{30}\mu$ and $OS_{40}\mu$, respectively coupled to the said bistable multivibrators each deliver a pulse through the or-gate O to the counter so that a 4 is set in it. Thus for each subsequent defect only that part of the annoyance value is registered which exceeds the value of the largest preceding defect.

Since the results of the perception research show that each defect following the first and having a value greater than a given threshold value causes additional annoyance, each defect following the first and causing an annoyance greater than 3 must additionally be assigned an additional counting pulse in that after each defect the bistable multivibrator $FF_4$ is automatically reset by the resetting of the pulse shaper $PS_{70}$. If the first defect is followed by a fault having an annoyance value at least equal to 4, the bistable multivibrator $FF_4$ again changes state and thus transmits an additional pulse to the counter through the associated monostable multivibrator $OS_{40}\mu$ and the or-gate O.

When defects occur in rapid succession, the annoyance caused proves to be extra serious and hence they are assigned an additional number of counting pulses by the circuit arrangement in the following manner.

At the first defect having an annoyance value at least equal to 2 a pulse is applied to a monostable multivibrator $OS_1$ having a reset time of 1 s, so that an and-gate $N_6$ the two inputs of which are coupled to a first output and to the input of the monostable multivibrator $OS_1$ is opened. If within 1 s a second defect having an annoyance value at least equal to 2 occurs, the gate allows the pulse at the output $h_2$ of the matrix M to pass, so that a bistable multivibrator A connected to the output of the and-gate $N_6$ changes state and through the or-gate O delivers a pulse to the counter and in addition causes a monostable multivibrator D to change state, which after 10 μs transmits a second pulse to the counter. If three defects occur within 1 s, the bistable multivibrator B also changes state. If four or more defects occur, a bistable multivibrator C also changes state and applied a pulse to the counter through the or-gate O. After 1 s the and-gate $N_0$ is closed because of the fact that the monostable multivibrator $OS_1$ is reset and in addition the ruffle counter comprising the bistable multivibrators A, B and C is reset.

More than four defects per second cause no increased annoyance, so that any further defects within this period are not recorded.

What is claimed is:

1. A device for testing record carriers defects in the record layer on which layer a constant amplitude test signal has been recorded comprising a magnetic head for scanning said signal recorded on said record layer and an amplifier electrically coupled to said head for amplifying said signal, a first rectifier means electrically coupled to said amplifier and having a time constant greater than the duration of the longest defect and serving to produce a reference voltage in response to an input voltage from said amplifier, a second rectifier means electrically coupled to said amplifier for producing an output voltage in response to an input voltage from said amplifier and having a time constant smaller than the duration of the shortest annoying defect, an attenuator having a plurality of tappings thereon, the input of said attenuator being connected to the second rectifier, said tappings connected to respective first inputs of a plurality of multi-input threshold detectors, means coupling said reference voltage of the first rectifier means to respective second inputs of said threshold detectors, the output of the first of said threshold detectors being connected to the input of a first pulse shaper, a first output of said first pulse shaper being connected to a time circuit comprising a first monostable multivibrator having a reset time of about 10 ms, which through a first output is connected to an input of a second monostable multivibrator having a reset time of about 20 ms, a first output of which is connected to a third monostable multivibrator having a reset time of about 50 ms, which multivibrators are mutually interconnected so as to simultaneously be caused to change states, a second output of the first monostable multivibrator and the first output of the second monostable multivibrator are each connected to an input of a first and-gate, and a second output of a second monostable multivibrator and the first output of the third monostable multivibrator are connected to a second and-gate, a second output of the first pulse shaper connected to the reset inputs of all of said monostable multivibrators and also to first inputs of third, fourth and fifth and-gates each having at least two inputs, the second inputs of said and-gates having connected thereto the outputs of the first and second and-gates and the second output of the third monostable multivibrator, respectively, the outputs of the third, fourth and fifth and-gates connected to first inputs of a matrix, second inputs of which are connected to the outputs of the remaining threshold detectors each through means for storing a magnitude corresponding to defect-depth, the outputs of the matrix each associated with an assigned designation representing a given annoyance value being connected to a counter.

2. The combination of claim 1 wherein an output of said matrix is coupled to a further circuit including a monostable multivibrator having a predetermined time delay, a plurality of pulse producing means coupled to said monostable multivibrator, and an output coupling said pulse producing means to said counter for counting additional annoyance values in response to a matrix output representing a rapid succession of defects.

3. A method of testing record carriers for defects in the record layer to determine the perceptual annoyance caused by said defects comprising placing a predetermined assignment of weighted annoyance values to predetermined combinations of depths and durations of defect signals, recording a test signal of constant amplitude on said carrier, separately measuring the depth and duration of each defect signal, wherein the depth of a defect is defined as the ratio of the voltage of said defect signal to the voltage of said test signal, combining and correlating the measured depth and duration of each defect signal to determine its annoyance value in accordance with said predetermined assignment, recording the annoyance value of each defect if it is above a predetermined minimum, and accumulating the annoyance values of all defects on said carrier under test.

4. A method as claimed in claim 3, wherein for each succeeding defect only that part of said annoyance value is recorded which exceeds the annoyance values of the greatest preceding defect.

5. A method as claimed in claim 3, wherein each defect following the first and having a level greater than a given threshold level, is assigned a constant additional annoyance value.

* * * * *

PO-1050
(5/69)

UNITED STATES PATENT OFFICE
CERTIFICATE OF CORRECTION

Patent No. 3,659,195 Dated April 25, 1972

Inventor(s) Benjamin Lopes Cardozo et al

It is certified that error appears in the above-identified patent and that said Letters Patent are hereby corrected as shown below:

Column 1, line 59, "n" should be --h--.
Column 4, line 18, "n" should be --m--.
Column 5, line 6, "applied" should be --applies--.

Claim 1, line 1, after "carriers" insert --for--.

Signed and sealed this 26th day of September 1972.

(SEAL)
Attest:

EDWARD M.FLETCHER,JR.
Attesting Officer

ROBERT GOTTSCHALK
Commissioner of Patents